(12) United States Patent
Choi et al.

(10) Patent No.: US 11,089,355 B2
(45) Date of Patent: Aug. 10, 2021

(54) IMAGE DISPLAY DEVICE AND METHOD OF PROVIDING BROADCAST PROGRAM INFORMATION

(71) Applicant: SAMSUNG ELECTRONICS CO., LTD., Suwon-si (KR)

(72) Inventors: Jongil Choi, Suwon-si (KR); Jongwon Kwak, Suwon-si (KR); Youngjin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/593,095

(22) Filed: Oct. 4, 2019

(65) Prior Publication Data

US 2020/0112764 A1 Apr. 9, 2020

(30) Foreign Application Priority Data

Oct. 5, 2018 (KR) .................. 10-2018-0119305

(51) Int. Cl.
*H04N 21/433* (2011.01)
*H04N 21/462* (2011.01)
(Continued)

(52) U.S. Cl.
CPC ....... *H04N 21/4332* (2013.01); *H04N 21/431* (2013.01); *H04N 21/437* (2013.01); *H04N 21/4425* (2013.01); *H04N 21/4622* (2013.01)

(58) Field of Classification Search
CPC ........... H04N 21/4332; H04N 21/4622; H04N 21/437; H04N 21/4425; H04N 21/431
See application file for complete search history.

(56) References Cited

U.S. PATENT DOCUMENTS 6,008,802 A 12/1999 Iki et al.
6,209,131 B1 3/2001 Kim et al.
(Continued)

FOREIGN PATENT DOCUMENTS

CN 1902929 A 1/2007
CN 101510971 A 8/2009
(Continued)

OTHER PUBLICATIONS

International Search Report (PCT/ISA/210) and Written Opinion (PCT/ISA/237) dated Jan. 28, 2020 issued by the International Searching Authority in International Application No. PCT/KR2019/013066.
(Continued)

*Primary Examiner* — Yassin Alata
(74) *Attorney, Agent, or Firm* — Sughrue Mion, PLLC (57) ABSTRACT

Provided are an image display device and an operation method thereof. An image display device for providing broadcast program information including a communication interface, a memory storing one or more instructions, and a processor configured to execute the one or more instructions stored in the memory. The one or more instructions may cause the processor to obtain electronic program guide (EPG) information about a broadcast program through the communication interface, obtain metadata about the broadcast program, compare the EPG information with the metadata, and based on identifying that the broadcast program indicated by the EPG information and the broadcast program indicated by the metadata are inconsistent (do not match), regenerate the broadcast program information to be provided to a user, based on the EPG information, and cause a display to display the regenerated broadcast program information on the display.

13 Claims, 8 Drawing Sheets

(51) Int. Cl.
*H04N 21/437* (2011.01)
*H04N 21/4425* (2011.01)
*H04N 21/431* (2011.01)

(56) References Cited

U.S. PATENT DOCUMENTS

| | | | |
|---|---|---|---|
| 8,356,318 B2 | 1/2013 | Kim et al. | |
| 9,648,390 B2 | 5/2017 | Perez | |
| 9,699,512 B2 | 7/2017 | Kulick et al. | |
| 9,992,540 B2 | 6/2018 | Casey et al. | |
| 10,986,406 B2 | 4/2021 | Kim et al. | |
| 2003/0051246 A1 | 3/2003 | Wilder et al. | |
| 2007/0209049 A1 | 9/2007 | Kelly et al. | |
| 2009/0204996 A1* | 8/2009 | Kim | H04N 21/4314 725/54 |
| 2009/0313656 A1 | 12/2009 | Lee | |
| 2013/0081075 A1 | 3/2013 | Kulick et al. | |
| 2014/0130099 A1* | 5/2014 | Kunisetty | H04N 21/4821 725/50 |
| 2016/0094877 A1* | 3/2016 | Heffernan | H04N 21/44008 725/19 |
| 2016/0241920 A1 | 8/2016 | Casey et al. | |
| 2018/0063558 A1* | 3/2018 | Stefanidis | H04N 21/23418 |
| 2018/0332328 A1* | 11/2018 | Sprenger | H04N 21/23418 |

FOREIGN PATENT DOCUMENTS

| | | |
|---|---|---|
| CN | 102790919 A | 11/2012 |
| CN | 102804797 A | 11/2012 |
| JP | 2000-307968 A | 11/2000 |
| JP | 2011-216932 A | 10/2011 |

OTHER PUBLICATIONS

Communication dated Apr. 26, 2021, from The China National Intellectual Property Administration in Application No. 201910953568.8.

* cited by examiner

| ERROR DATA |
|---|
| HEADEND ID |
| EPG INFORMATION (CHANNEL NAMES, CHANNEL NUMBERS, BROADCAST PROGRAM TITLES, BROADCAST TIMES, BROADCAST EPISODE INFORMATION) |

IMAGE DISPLAY DEVICE AND METHOD OF PROVIDING BROADCAST PROGRAM INFORMATION

CROSS-REFERENCE TO RELATED APPLICATION(S)

This application is based on and claims priority under 35 U.S.C. § 119 to Korean Patent Application No. 10-2018-0119305, filed on Oct. 5, 2018, in the Korean Intellectual Property Office, the disclosure of which is incorporated by reference herein in its entirety.

BACKGROUND

1. Field

The disclosure relates to an image display device and an operation method thereof, and more particularly, to an image display device that provides highly accurate broadcast program information and an operation method thereof.

2. Description of Related Art

Display devices may display or cause a display to display images viewable by one or more users. The user(s) may view a broadcast through a display of or connected to the display devices. Display devices may display or cause to be displayed, on their respective displays, a broadcast selected by the users from among broadcast signals transmitted from broadcasting stations. Broadcasts have recently changed from analog broadcasts into digital broadcasts all over the world.

A digital broadcast may transmit digital images and audio signals. Compared with an analog broadcast, the digital broadcast is robust to external noise and thus has advantages such as low data loss, easy error correction, high resolution, and a clear screen. In addition, unlike the analog broadcast, the digital broadcast may provide bi-directional services.

In addition to a digital broadcast function, a smart television (TV) providing various contents is provided. The smart TV may aim at analyzing and providing what a user desires without an operation of the user, rather than manually operating according to a selection of the user.

In addition, display devices may provide the users with information about a broadcast program. At this time, the display devices may provide the broadcast program information using electronic program guide (EPG) information transmitted from a broadcasting station and metadata obtained from a metadata provider. Thus, development of a method of more accurately providing the broadcast program information to the users is required.

SUMMARY

The disclosure provides an image display device that may provide highly accurate broadcast program information and an operation method thereof.

The technical problems to be achieved by the disclosure are not limited to those mentioned above, and other technical problems which are not mentioned may be clearly understood by those of skill in the art from the following descriptions.

Additional aspects will be set forth in part in the description which follows and, in part, will be apparent from the description, or may be learned by practice of the presented embodiments of the disclosure.

According to an embodiment of the disclosure, an image display device for providing broadcast program information may include a communication interface, a display, a memory that stores one or more instructions, and a processor configured to execute the one or more instructions stored in the memory to perform a series of steps. The series of steps may include: obtaining electronic program guide (EPG) information about a broadcast program, such as, from a broadcast server through the communication interface. The series of steps may also include obtaining metadata about the broadcast program, such as, from a metadata server through the communication interface. The series of steps may also include comparing the EPG information with the metadata, and based on identifying that the broadcast program indicated by the EPG information and the broadcast program indicated by the metadata are inconsistent, regenerating the broadcast program information to be provided to a user, based on the EPG information. The series of steps may also include causing the display to display the regenerated broadcast program information.

According to another embodiment of the disclosure, a method of providing program information, which may be performed by an image display device, may include obtaining electronic program guide (EPG) information about a broadcast program, such as, from a broadcast server; obtaining metadata about the broadcast program, such as, from a metadata server; comparing the EPG information with the metadata; and based on identifying that the broadcast program indicated by the EPG information and the broadcast program indicated by the metadata are inconsistent, regenerating the broadcast program information to be provided to a user, based on the EPG information, and displaying the regenerated broadcast program information on the display.

According to another embodiment of the disclosure, a system for providing broadcast program information may include an image display device that may be configured to compare electronic program guide (EPG) information about a broadcast program, which may be obtained from a broadcast server with metadata about a broadcast program, which may be obtained from a metadata server, generate error data about a broadcast program in which the broadcast program indicated by the EPG information and the broadcast program indicated by the metadata are identified to be inconsistent, and transmit the error data to a feedback server. The feedback server may be configured to analyze the error data and provide the error data to, for example, a metadata provider that generated the metadata.

According to another embodiment of the disclosure, a non-transitory computer-readable recording medium having recorded thereon a program for executing a method on a computer is provided. The method may correspond to the method described above.

According to another embodiment of the disclosure, a device may comprise: a memory that stores one or more instructions, and a processor configured to execute the one or more instructions stored in the memory. The one or more instructions may cause the processor to: recognize a broadcast program that the display is currently displaying, obtain electronic program guide (EPG) information about the recognized broadcast program, compare a currently scheduled broadcast program in the EPG information with the recognized broadcast program that the display is currently displaying, and based on identifying that the currently scheduled broadcast program and the recognized broadcast program that a display is currently displaying are different, cause the EPG information to be updated.

According to an embodiment of the disclosure, the processor may be configured to communicate with an automatic content recognition (ACR) server to confirm that broadcast program information included in the EPG information about the broadcast program currently displayed on the display actually corresponds to the broadcast program currently displayed on the display.

According to an embodiment of the disclosure, the EPG information includes one or more of: a channel name, a channel number, a broadcast program title, a broadcast time, or broadcast episode information.

According to an embodiment of the disclosure, the device comprises the display.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The disclosure will now be described more fully with reference to the accompanying drawings, in which embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those of skill in the art. For clarity, portions that are not relevant to the description of the disclosure are omitted, and like reference numerals in the drawings denote like elements.

The terms used in this specification are those general terms currently widely used in the art in consideration of functions regarding the disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the specification should be understood not as simple names but based on the meaning of the terms and the overall description of the disclosure.

While such terms as "first", "second", etc., may be used to describe various components, such components must not be limited to the above terms. The above terms are used only to distinguish one component from another.

The terms used in the present specification are merely used to describe particular embodiments of the disclosure, and are not intended to limit the disclosure. An expression used in the singular encompasses the expression of the plural, unless it has a clearly different meaning in the context. It will be understood that when region is referred to as being "connected to" another region, the region may be directly connected to the other region or electrically connected thereto with an intervening region therebetween. It will be further understood that the terms "comprises" and/or "comprising" used herein specify the presence of stated features or components, but do not preclude the presence or addition of one or more other features or components.

The use of the terms "a" and "an" and "the" and similar referents in the context of describing the disclosure are to be construed to cover both the singular and the plural. Also, when a specific process order is not clearly stated, described processes may be performed in an appropriate order. Processes described in the disclosure are not limited to the described order.

Phrases such as "in an embodiment" and "in an embodiment" in the present specification do not indicate the same embodiment of the disclosure.

The disclosure may be described in terms of functional block components and various processing steps. Some or all functional blocks may be realized as any number of hardware and/or software components configured to perform the specified functions. For example, the functional blocks may be realized by at least one micro-processor or circuits for performing certain functions. Also, the functional blocks may be realized with any programming or scripting language. The functional blocks may be realized in the various algorithms that are executed on one or more processors. Furthermore, the disclosure could employ any number of conventional techniques for electronics configuration, signal processing and/or control, data processing and the like. The words "mechanism", "element", "means", and "configuration" are used broadly and are not limited to mechanical or physical embodiments of the disclosure.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Throughout the disclosure, the expression "at least one of a, b or c" indicates only a, only b, only c, both a and b, both a and c, both b and c, or all of a, b, and c, or variations thereof.

Hereinafter, the disclosure will be described in detail with reference to the attached drawings.

Figure 1:
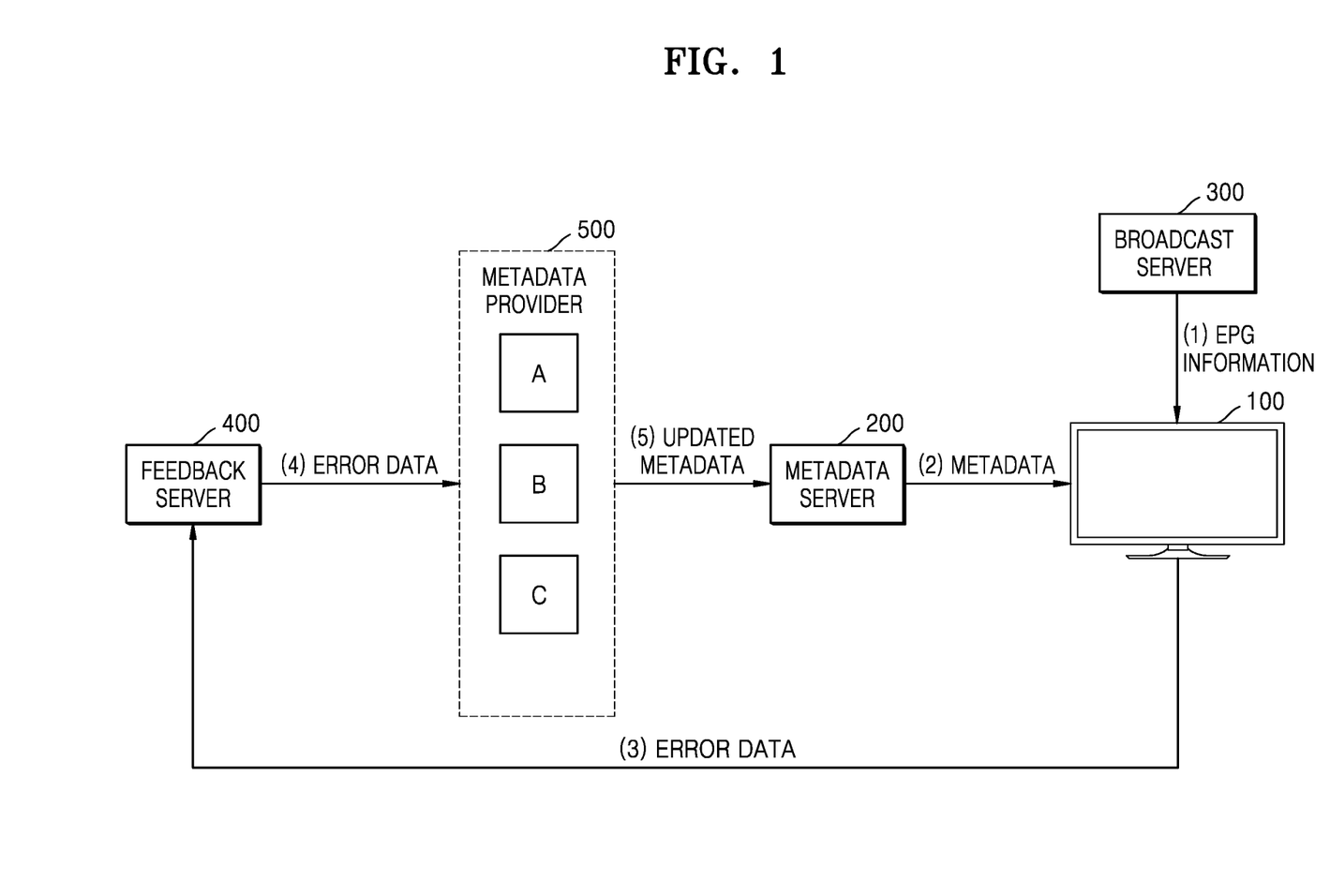
FIG. 1 shows a schematic diagram for explaining an operation of a system according to an embodiment of the disclosure.

FIG. 1 shows a schematic diagram for explaining an operation of a system according to an embodiment of the disclosure.

Referring to FIG. 1, the system according to an embodiment of the disclosure may include an image display device 100, a metadata server 200, a broadcast server 300, a feedback server 400, and a metadata provider 500 (which may include a metadata provider computer or metadata provider server).

Figure 2:
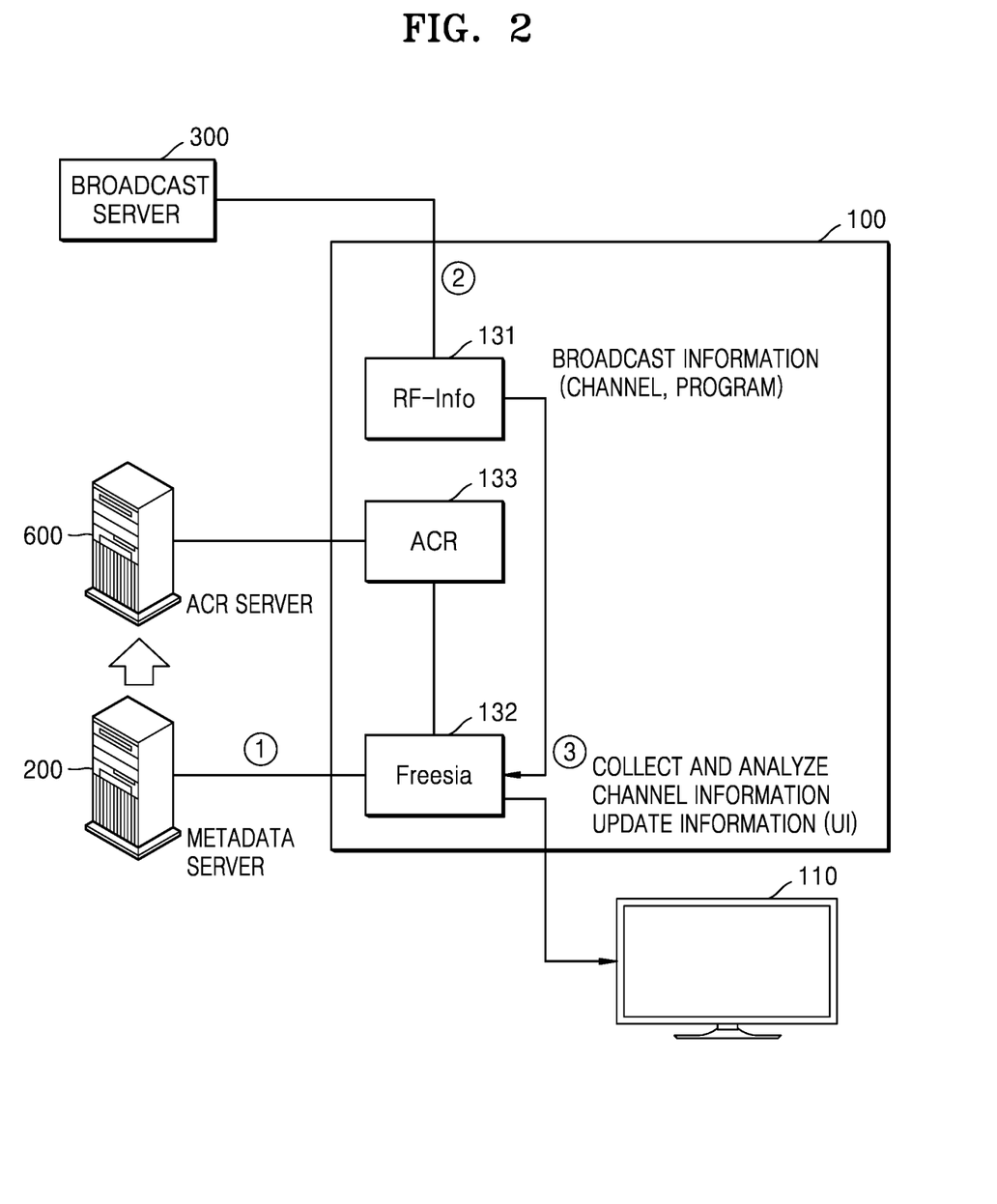
FIG. 2 shows a schematic diagram for explaining an operation of an image display device according to an embodiment of the disclosure.

The image display device 100 of FIGS. 1 and 2 may be a television (TV), but is not limited thereto. According to an embodiment of the disclosure, the image display device 100 (e.g., the TV) may obtain a broadcast signal (i.e., a radio frequency (RF) signal) from the broadcast server 300 (e.g., a broadcast station server). At this time, the image display device 100 may obtain electronic program guide (EPG) information, which may include information about a broadcast program. For example, the EPG information may include information about one or more of: a channel name or channel names, a program title or program titles, a broadcast time or broadcast times, or a broadcast episode or broadcast episodes, or the like.

Also, according to an embodiment of the disclosure, the image display device 100 (e.g., the TV) may obtain metadata including more detailed information about the broadcast program from the external metadata provider 500.

That is, to provide more detailed and rich program information to a user than the EPG information obtained together with a broadcast signal from the broadcasting server 300, the metadata server 200 may collect metadata provided by a plurality of external metadata providers 500 (e.g., one or more of A, B, C, or the like) and provide the collected metadata to the image display device 100.

For example, the metadata may include more detailed information about the broadcast program. For example, the detailed information about the broadcast program may include one or more of: other recommendation program information (e.g., other recommendation program information in which a performer appears), information regarding a person appearing in the broadcast program, or product information, or the like.

According to an embodiment of the disclosure, the image display device 100 may generate broadcast program information using the EPG information obtained from the broadcast server 300 and the metadata obtained from the metadata server 200 and provide the broadcast program information to the user.

According to an embodiment of the disclosure, the image display device 100 may display the broadcast program information on a display 110 (FIGS. 7 and 8), based on a user input signal requesting the broadcast program information.

Meanwhile, the metadata provided by the metadata server 200 may be collected from one or more of the various metadata providers 500, and it may be possible that the metadata provider 500 has provided information different from a program that is actually being broadcasted.

For example, it may be possible that the metadata provider 500 has provided metadata that does not match an actual broadcast program to the metadata server 200 due to an information collection error during a process of collecting a channel schedule table of various broadcast channels.

Also, for example, when one of: a game is canceled (e.g., a baseball game canceled due to sudden rain), a program is urgently scheduled (e.g., a movie program), or the metadata server 200 does not confirm a changed program in real time, there is a possibility that the metadata previously provided from the metadata server 200 and the EPG information which is information about a broadcast program currently transmitted from the broadcast server 300 are different.

To prevent an error in providing the user with different information from the broadcasting program currently being broadcasted, the image display device 100 according to an embodiment of the disclosure may perform an operation of comparing the EPG information with the metadata.

The image display device 100 according to an embodiment of the disclosure may compare the EPG information and the metadata, and based on identifying that the EPG information and the metadata are inconsistent (e.g., do not match), may regenerate broadcast program information to be provided to the user based on the EPG information.

In addition, the image display device 100 according to an embodiment of the disclosure may generate error data about a broadcast program in which the EPG information and the metadata are determined to be inconsistent.

The error data according to an embodiment of the disclosure may include information for indicating that the broadcast program actually broadcasted is different from the broadcast program indicated by the metadata previously provided from the metadata server 200. The error data according to an embodiment of the disclosure may include information about the broadcast program actually broadcasted.

Figure 3:
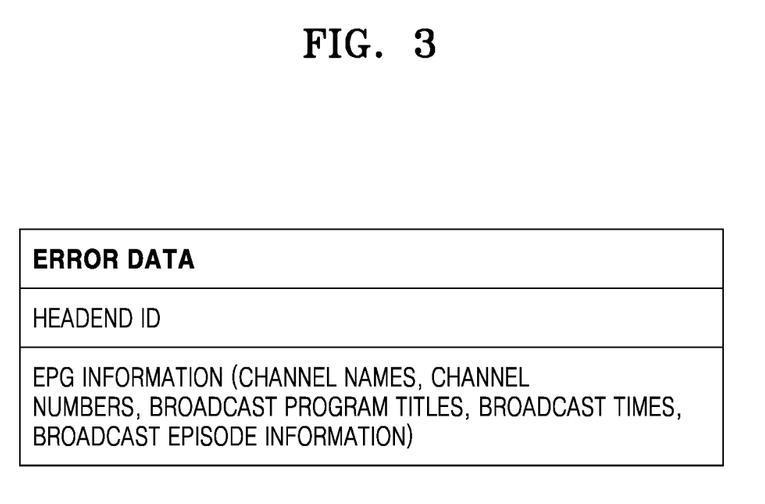
FIG. 3 shows a diagram for explaining an example of error data according to an embodiment of the disclosure.

Referring to FIG. 3, FIG. 3 is a diagram for explaining an example of error data according to an embodiment of the disclosure. For example, the error data may include information (e.g., a headend-identification (ID)) about the broadcast server 300 providing the broadcast program actually broadcasted and the EPG information (e.g., one or more of: a channel name, a channel number, a broadcast program title, a broadcast time, or a broadcast episode information, etc.) obtained from the broadcast server 300.

The system according to an embodiment of the disclosure may include a feedback server 400.

The image display device 100 according to an embodiment of the disclosure may transmit the error data to the feedback server 400. The feedback server 400 may analyze the obtained error data. The feedback server 400 may analyze the obtained error data to transmit the error data to the metadata provider 500 that provides error metadata.

The metadata provider 500 obtaining the error data according to an embodiment of the disclosure may update the metadata based on the error data and transmit the updated metadata to the metadata server 200.

For example, based on the metadata provided from the metadata provider 500 including erroneous information regarding an already finished broadcast program and the erroneous information being continuously provided, the error data may be obtained as feedback provided from the image display device 100, which enables to provide accurate broadcast program information through metadata correction.

Figure 7:
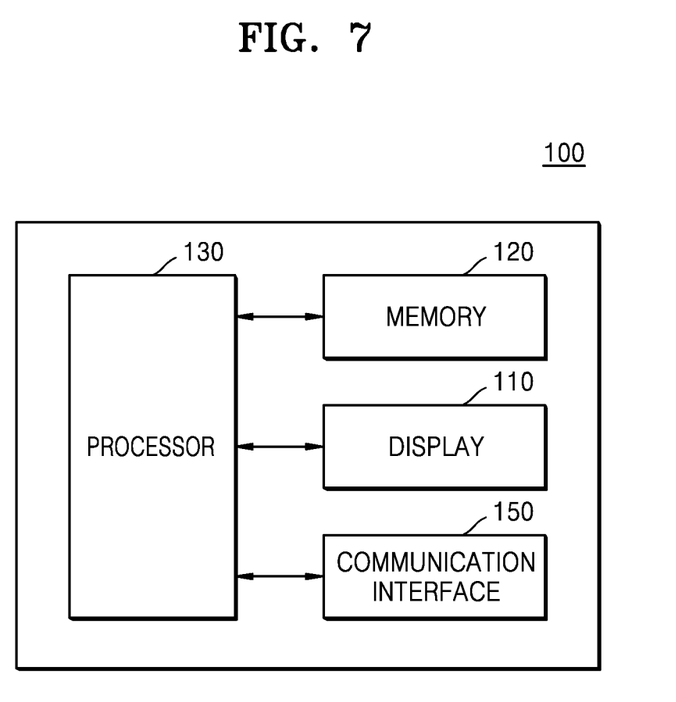
FIG. 7 shows a block diagram of an image display device according to an embodiment of the disclosure.
Figure 8:
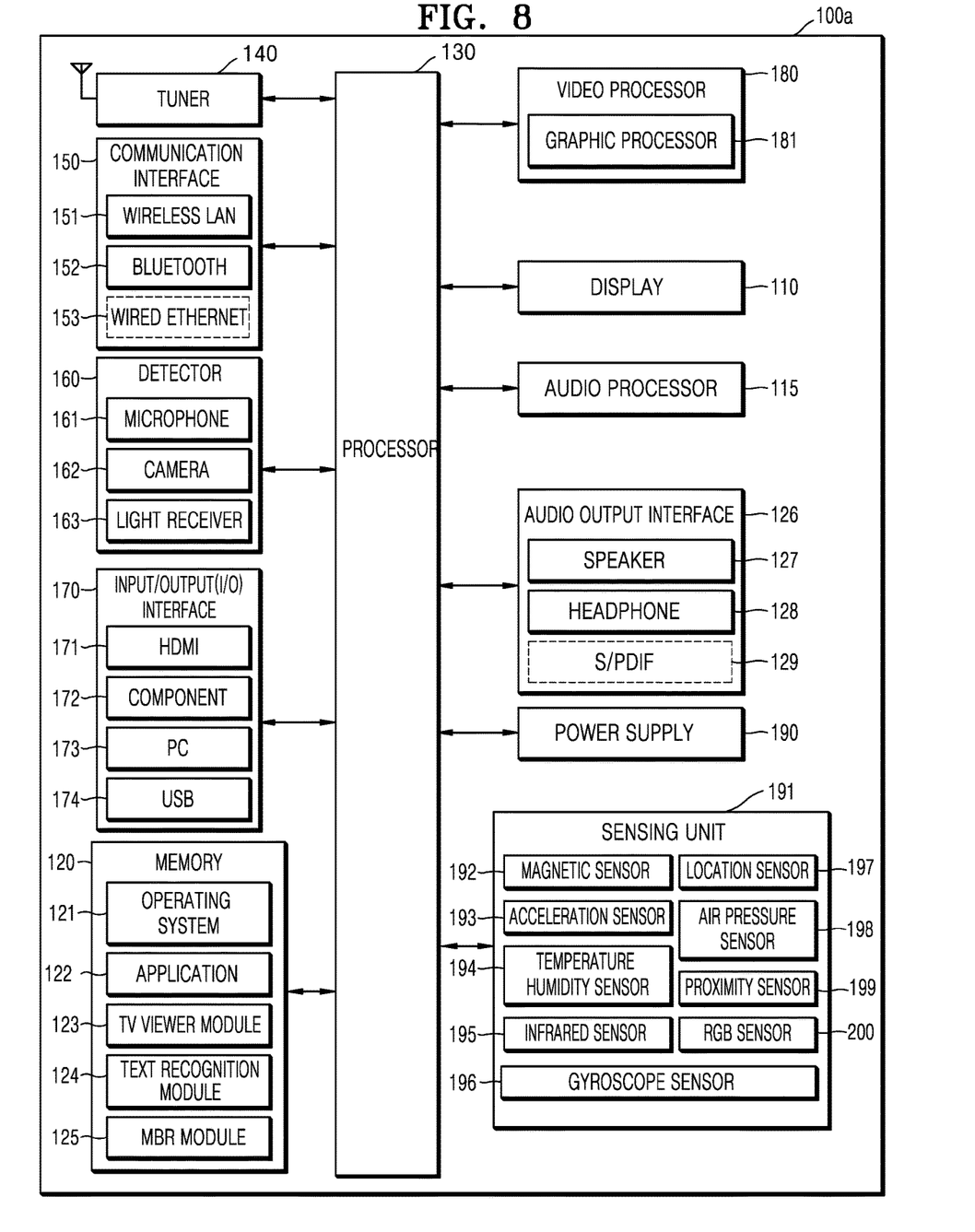
FIG. 8 shows a block diagram of an image display device according to an embodiment of the disclosure.

Meanwhile, the image display device 100 according to an embodiment of the disclosure may be implemented as a device including the display 110 (FIGS. 7 and 8). The image display device 100 according to an embodiment of the disclosure may be a TV, but is not limited thereto. For example, the image display device 100 may be implemented as various electronic devices such as a desktop, a tablet personal computer (PC), a laptop computer, a mobile phone, an electronic book terminal, a digital broadcasting terminal, a personal digital assistant (PDA), a portable multimedia player (PMP), a navigation device, a digital camera, a camcorder, an MP3 player, or a wearable device, or the like. Also, the image display device 100 may be a fixed or mobile type device, and may include or be a digital broadcast receiver capable of obtaining a digital broadcast.

In addition, the image display device 100 according to an embodiment of the disclosure may be implemented as a curved display device having a curvature or a flexible display device capable of adjusting the curvature as well as a flat display device. The output resolution of the image display device 100 may include, for example, HD (high definition), Full HD, Ultra HD, or Ultra HD, or a resolution that is clearer than Ultra HD. The image display device 100 according to an embodiment of the disclosure may output content (image and sound data) input through various external input sources (e.g., a set-top box, etc.)

FIG. 1 illustrates an embodiment of the disclosure, but is not limited thereto.

FIG. 2 shows a schematic diagram for explaining an operation of the image display device 100 according to an embodiment of the disclosure.

FIG. 2 shows a diagram for explaining an example of a module for performing each of a plurality of operations that may be performed by the image display device 100.

According to an embodiment of the disclosure, the image display device 100 may include a Radio Frequency (RF)-Info module 140, an automatic content recognition (ACR) module 133, and a Freesia module 132.

According to an embodiment of the disclosure, the RF-Info module 131 may obtain a broadcast signal from, for example, the broadcast station server 300. The broadcast signal may include audio, video, and additional broadcast information (for example, electronic program guide (EPG) information).

According to an embodiment of the disclosure, the RF-Info module 140 may include a tuner 140 (see FIG. 8).

In addition, the ACR module 133 may identify a broadcast program that the display 110 is currently displaying. For example, the ACR module may recognize content that is playing or stored and identify metadata regarding the content, such as, identification information regarding the content.

The ACR module 133 may confirm broadcast program information about the broadcast program currently displayed on the display 110 from the ACR server 600.

At this time, because the ACR server 600 possesses metadata provided from the metadata server 200, when the metadata server 200 has erroneous metadata, the erroneous metadata may also be identified by the ACR server 600 in the same manner. Accordingly, when the possessed metadata is updated, the metadata server 200 may transmit the updated metadata to the ACR server 600 and share the same, thereby providing more highly accurate broadcast program information.

On the other hand, the Freesia module 131 may obtain the EPG information from the RF-Info module 131. The Freesia module 131 may also obtain the metadata from the metadata server 200. The Freesia module 131 may check whether there is an error in the metadata by analyzing and comparing EPG information and the metadata.

The Freesia module 131 may control the display 110 to regenerate and display the broadcast program information based on the EPG information based on identifying that the EPG information and the metadata are inconsistent (e.g., do not match).

According to an embodiment of the disclosure, in FIG. 2, the operation of each of the independent modules is described but is not limited thereto, and the operation of each independent module may be performed in accordance with the control of the processor 130 of FIGS. 7 and 8.

Figure 4:
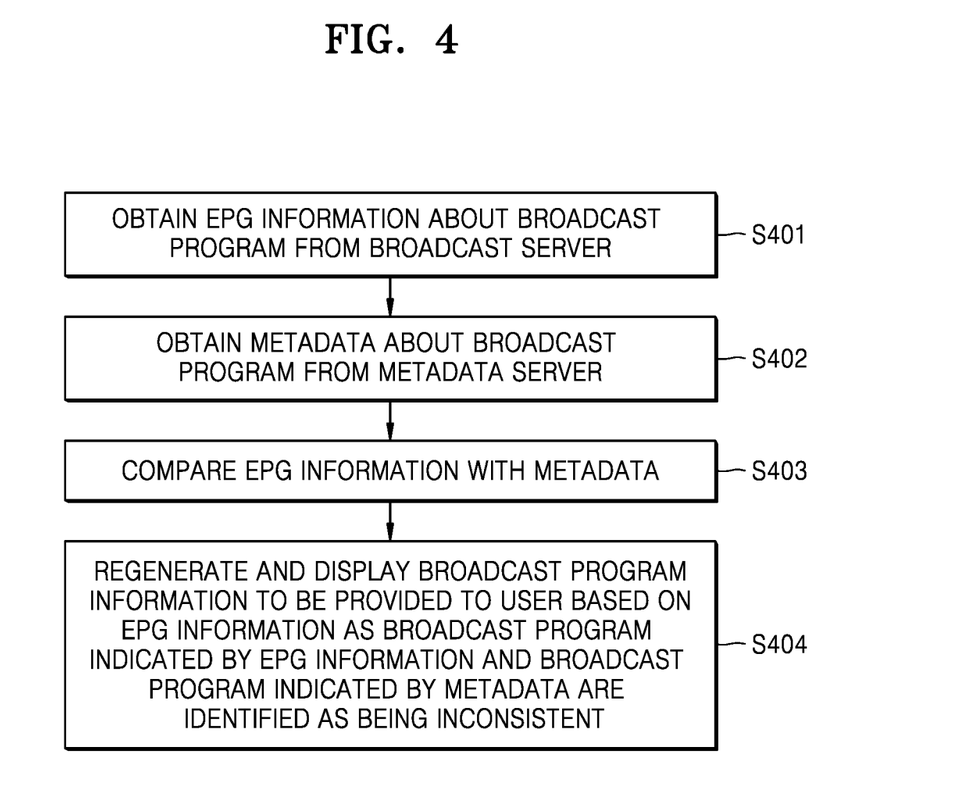
FIG. 4 shows a flowchart of a method, performed by an image display device, of providing broadcast program information according to an embodiment of the disclosure.

FIG. 4 shows a flowchart of a method, performed by an image display device, of providing broadcast program information according to an embodiment of the disclosure.

In operation S401, the image display device 100 may obtain EPG information about a broadcast program from the broadcast server 300.

For example, the image display device 100 may obtain the EPG information obtained together with a broadcast signal RF. The EPG information may include information such as one or more of: a broadcast channel, a broadcast program title, or a broadcast time, or the like as detailed information about the broadcast program.

In operation S402, the image display device 100 may obtain metadata about a broadcast program from the metadata server.

For example, the metadata may include program related information generated and provided by the metadata provider 500, and may include more diverse and richer information than the EPG information about the broadcast program. For example, the metadata may include detailed information that includes information about one or more of: a performer appearing in the broadcast program, recommendation information of a similar program, or product information appearing in the broadcast program, etc.).

In operation S403, the image display device 100 may compare the EPG information and the metadata.

According to an embodiment of the disclosure, the image display device 100 may obtain the EPG information together with the broadcast signal RF and may identify whether previously collected metadata corresponding to a specific channel of a current time zone and the currently obtained EPG information are consistent as information about the same program.

When a broadcast program indicated by the currently obtained EPG information and a broadcast program indicated by the previously collected metadata are identified as being the same program, the image display device 100 may generate broadcast program information to be provided based on a request signal of a user using the EPG information and the metadata.

In operation S404, based on identifying that the broadcast program indicated by the currently obtained EPG information and the broadcast program indicated by the previously collected metadata are inconsistent (i.e., do not match), the image display device 100 may regenerate the broadcast program information to be provided to the user based on the EPG information and may display the broadcast program information.

According to an embodiment of the disclosure, based on identifying that the broadcast program indicated by the currently obtained EPG information is inconsistent with the broadcast program indicated by the previously collected metadata corresponding to the specific channel of the current time zone, because the EPG information is information about an actually broadcasted broadcast program, the image display device 100 may regenerate the broadcast program information to be provided to the user.

According to an embodiment of the disclosure, the image display device 100 may display the regenerated broadcast program information on the display 110 based on the request signal of the user.

According to an embodiment of the disclosure, the image display device 100 may perform an operation of comparing the EPG information with the metadata, thereby providing more highly reliable broadcast program information.

Figure 5:
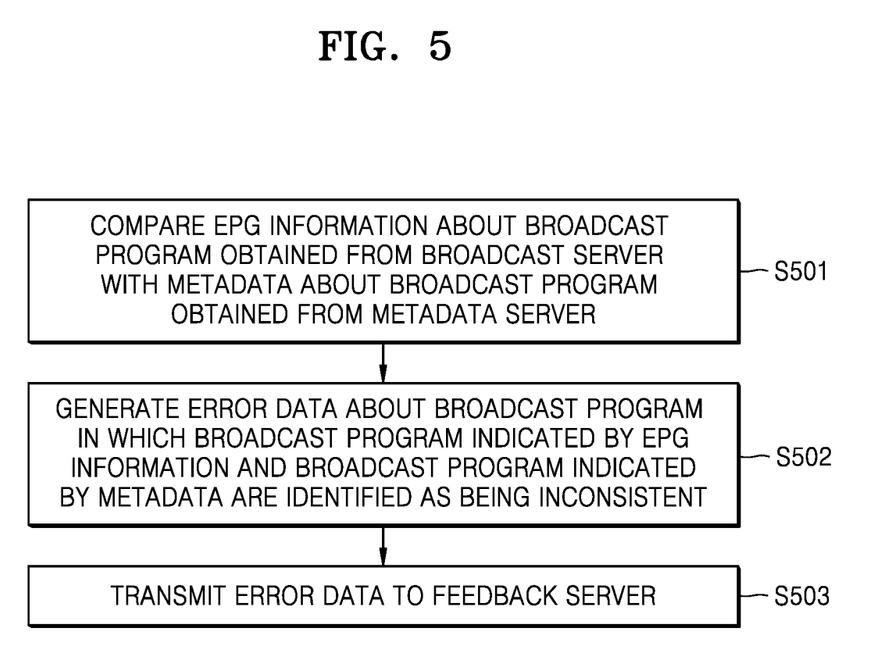
FIG. 5 shows a flowchart of a method, performed by an image display device, of generating error data according to an embodiment of the disclosure.

FIG. 5 shows a flowchart of a method, performed by the image display device 100, of generating error data according to an embodiment of the disclosure.

In operation S501, the image display device 100 may compare EPG information about a broadcast program obtained from a broadcast server with metadata about a broadcast program obtained from a metadata server.

In operation S502, the image display device 100 may generate error data about a broadcast program in which the broadcast program indicated by the EPG information and the broadcast program indicated by the metadata are identified as being inconsistent (i.e., not matching).

In operation S503, the image display device 100 may transmit the error data to the feedback server 400.

According to an embodiment of the disclosure, the image display device 100 may transmit the error data to the feedback server 400 during a predetermined period.

According to an embodiment of the disclosure, the image display device 100 may store the error data generated in operations S501 and S502 in the memory 120.

According to an embodiment of the disclosure, the image display device 100 may transmit a plurality of pieces of error data stored in the memory 120 to the feedback server 400 based on the error data being accumulated to be a predetermined amount of data or more.

Also, according to an embodiment of the disclosure, the image display device 100 may transmit the plurality of pieces of error data stored in the memory 120 to the feedback server 400 during a preset time interval.

Figure 6:
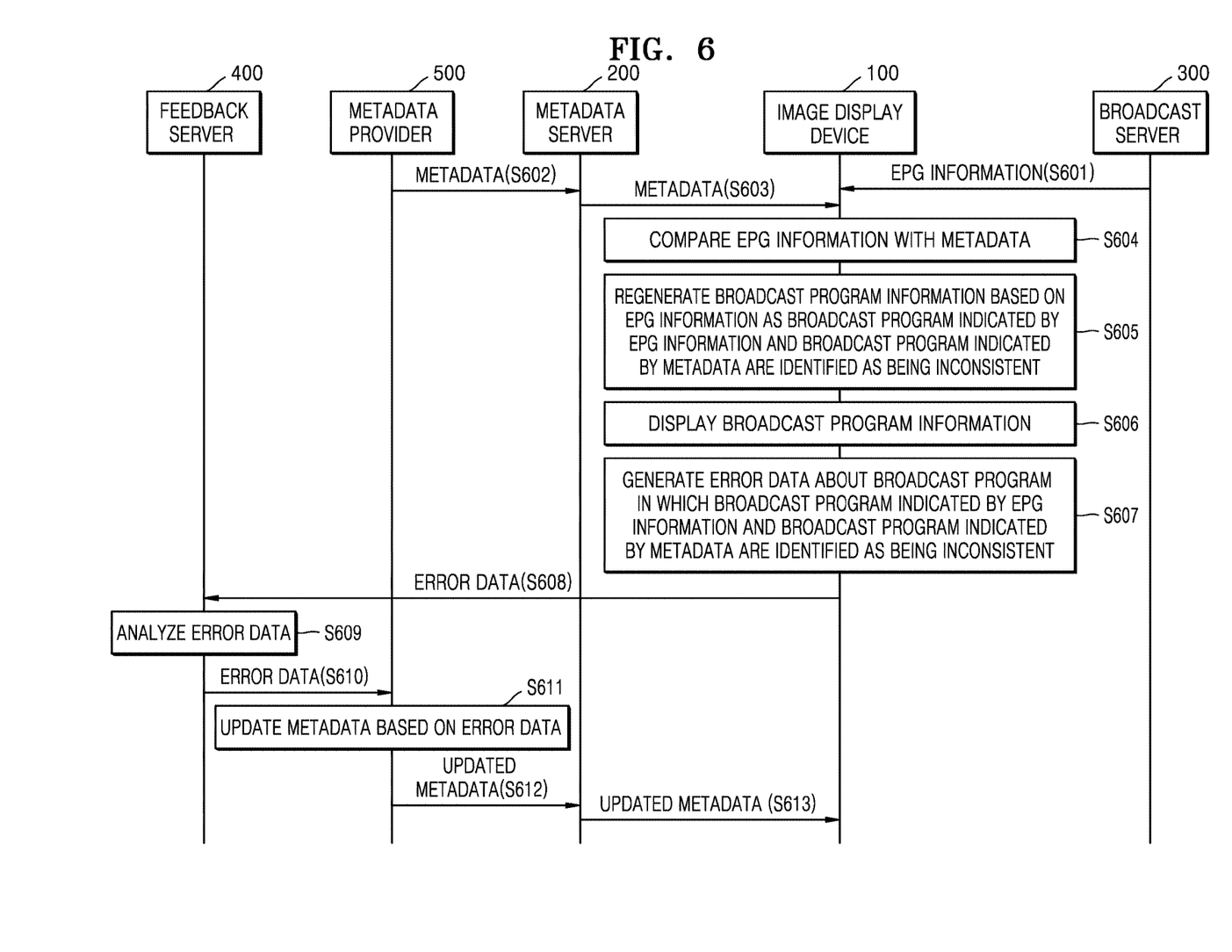
FIG. 6 shows a flowchart of an operation method of a system according to an embodiment of the disclosure.

FIG. 6 shows a flowchart of an operation method of a system according to an embodiment of the disclosure.

In operation S601, the image display device 100 may obtain EPG information from the broadcast server 300.

On the other hand, in operation S602, the metadata server 200 may obtain metadata from the metadata provider 500. In operation S603, the image display device 100 may obtain the metadata from the metadata server 200.

In operation S604, the image display device 100 may compare the EPG information obtained from the broadcast server 300 with the metadata obtained from the metadata server 200.

In operation S605, the image display device 100 may regenerate broadcast program information based on the EPG information, based on identifying that a broadcast program indicated by the EPG information and a broadcast program indicated by the metadata are inconsistent.

According to an embodiment of the disclosure, because the EPG information obtained from the broadcast server 300 is obtained together with the broadcast signal RF transmitted by the broadcast server 300, when the broadcast program indicated by the EPG information and the broadcast program indicated by the previously collected metadata are inconsistent, the EPG information will be in conformity with a broadcast program actually broadcasted, and thus the image display device 100 may generate the broadcast program information based on the EPG information.

In operation S606, the image display device 100 may display the regenerated broadcast program information on the display 110.

According to an embodiment of the disclosure, the image display device 100 may display the broadcast program information on the display 110 based on an input signal requesting the broadcast program information using a control device (not shown) (e.g., a remote controller) being transmitted by a user.

In operation S607, the image display device 100 may generate error data relating to a broadcast program in which the broadcast program indicated by the EPG information and the broadcast program indicated by the metadata are identified as being inconsistent.

According to an embodiment of the disclosure, the error data may include information for indicating that the broadcast program actually broadcasted is different from the broadcast program indicated by the metadata previously provided from the metadata server 200. The error data may include information about the broadcast program actually broadcasted. For example, the error data may include information (e.g., a headend-ID) about the broadcast server 300 providing the broadcast program actually broadcasted and the EPG information (e.g., one or more of: a channel name, a channel number, a broadcast program title, a broadcast time, or a broadcast episode information, etc.) obtained from the broadcast server 300.

In operation S607, the image display device 100 may transmit the error data to the feedback server 400.

In operation S608, the feedback server 400 may analyze the error data.

In operation S609, the feedback server 400 may provide the error data to the metadata provider 500.

According to an embodiment of the disclosure, the feedback server 400 may analyze the error data and may transmit the error data to the metadata provider 500 that provides erroneous metadata.

In operation S610, the metadata provider 500 may update the metadata based on the error data. According to an embodiment of the disclosure, the metadata provider 500 may correct the erroneous metadata based on the error data obtained from the feedback server 400.

In operation S611, the metadata provider 500 may transmit the updated metadata to the metadata server 200. In operation S612, the metadata server 200 may transmit the updated metadata to the image display device 100.

According to an embodiment of the disclosure, the metadata provider 500 may correct the erroneous metadata as feedback information provided by the image display device 100, and provide the updated metadata to the image display device 100. Thus, the quality of providing the broadcast program information may be improved. Accordingly, the reliability of a broadcast program information providing service may be increased.

In addition, according to an embodiment of the disclosure, a more highly reliable recommendation service may be provided to a user by using highly accurate detailed information about a broadcast program being broadcasted.

FIGS. 4 to 6 show an embodiment of the disclosure, but are not limited thereto.

FIGS. 7 and 8 show block diagrams of the image display device 100 and an image display device 100a, respectively, according to an embodiment of the disclosure.

As shown in FIG. 7, the image display device 100 according to an embodiment of the disclosure may include a memory 120, a processor 130, and a communication interface 150. However, all illustrated components are not indispensable components. The image display device 100 may be implemented by more components than the illustrated components, and the image display device 100 may be implemented by less components than the illustrated components.

For example as shown in FIG. 8, the image display device 100 may be configured to correspond to image display device 100a according to an embodiment of the disclosure. Image display device 100a may include one or more of: a display 110, a tuner 140, a communication interface 150, a detector 160, an input/output interface 170, a video processor 180, an audio processor 115, an audio output interface 126, a power supply 190, and a sensing unit 191, which may be in addition to the memory 120, the processor 130, and the communication interface 150.

The image display device 100a of FIG. 8 may be an embodiment of the disclosure of the image display device 100 of FIG. 7.

Hereinafter, the components will be described.

The processor 130 may control the overall operation of the image display device 100 and the flow of a signal between internal components of the image display device 100 and may process data. Based on a user input being obtained or a stored predetermined condition being satisfied, the processor 130 may run an operating system (OS) and various applications stored in the memory 120.

The processor 130 may include a random access memory (RAM) that may store a signal or data input from the outside of the image display device 100 or may be used as a storage region corresponding to various jobs performed by image display device 100, a read only memory (ROM) in which a control program for controlling the image display device 100 may be stored, and a processor.

The processor 130 may include a graphic processing unit (GPU) (not shown) for graphic processing corresponding to a video. The processor 130 may be implemented as a System On Chip (SoC) incorporating a core (not shown) and a GPU (not shown). The processor 130 may include a single core, a dual core, a triple core, a quad core, and multiple cores thereof.

Also, the processor 130 may include a plurality of processors. For example, the processor 130 may be implemented as a main processor (not shown) and a sub processor (not shown) operating in a sleep mode.

According to an embodiment of the disclosure, the processor 130 may execute one or more instructions stored in the memory 120 to obtain EPG information about a broadcast program from the broadcast server 300 through the communication interface 150

According to an embodiment of the disclosure, the processor 130 may execute the one or more instructions stored in the memory 120 to obtain metadata about the broadcast program from the metadata server 200 through the communication interface 150.

According to an embodiment of the disclosure, the processor 130 may execute the one or more instructions stored in the memory 120 to compare the EPG information and the metadata.

According to an embodiment of the disclosure, based on identifying that the broadcast program indicated by the EPG information and the broadcast program indicated by the metadata are inconsistent, the processor 130 may execute the one or more instructions stored in the memory 120 to regenerate broadcast program information to be provided to a user based on the EPG information and may display the broadcast program information on the display 110.

Further, according to an embodiment of the disclosure, the processor 130 may execute the one or more instructions stored in the memory 120 to generate error data about a broadcast program in which the EPG information and the metadata are identified as being inconsistent and may transmit the error data to the feedback sever 400.

Further, according to an embodiment of the disclosure, the processor 130 may execute the one or more instructions stored in the memory 120 to transmit the error data to the feedback server 400 during a predetermined period.

The memory 120 may store various data, programs, or applications for driving and controlling the image display device 100 under the control of the processor 130. The memory 120 may store input/output signals or data corresponding to the driving of one or more of: a video processor 180, the display 110, an audio processor 115, an audio output interface 126 (e.g., a speaker), a power supply 190, a tuner 140, the communication interface 150, a detector 160, and an input/output interface 170.

The memory 120 may store information regarding one or more of: an operating system 121 for control of the image display device 100 and the processor 130, an application 122 that is originally provided by a manufacturer or is downloaded from an external source, a graphical user interface (GUI) related to the application 122, an object (e.g., an image text, an icon, a button, etc.) for providing the GUI, user information, one or more documents, one or more databases, or related data.

Also, the memory 120 may obtain a TV viewer module 123 including one or more instructions for obtaining an input signal from a remote control device (not shown) and thereby performing channel control corresponding to the input signal or entering a channel scroll user interface mode based on the input signal corresponding to a predefined input. The memory may also obtain and/or store a text recognition module 124 including one or more instructions for recognizing information from content obtained from an external device (not shown). The memory may also obtain and/or store a master boot record (MBR) module 125 including one or more instructions for channel control from the external device (not shown).

The memory 120 may include one or more of: a ROM, a RAM, or a memory card (e.g., a micro secure digital (SD) card, a universal serial bus (USB) memory, not shown) mounted on the image display device 100. The memory 120 may also include one or more of: a non-volatile memory, a volatile memory, a hard disk drive (HDD), or a solid state drive (SSD).

According to an embodiment of the disclosure, the memory 120 may include at least one type of storage medium from among: a flash memory type, a hard disk type, a multimedia card micro type, a card type memory (e.g., SD or eXtreme digital (XD) memory, etc.), random access memory (RAM), static random access memory (SRAM), read only memory (ROM), electrically erasable programmable read-only memory (EEPROM), programmable read-only memory (PROM), a magnetic memory, a magnetic disk, or an optical disk.

According to an embodiment of the disclosure, the memory 120 may store the metadata obtained from the metadata server 200.

According to an embodiment of the disclosure, the memory 120 may also store the EPG information obtained from the broadcast server 300.

According to an embodiment of the disclosure, the memory 120 may also store error data generated by the processor 130.

The display 110 may display video included in a broadcast signal obtained through the tuner 140 (FIG. 3) under the control of the processor 130 on a screen. Also, the display 110 may display content (e.g., a moving image) input through the communication interface 150 or the input/output interface 170. The display 110 may output an image stored in the memory 120 under the control of the processor 130.

The display 110 may generate a driving signal by converting one or more of: an image signal, a data signal, an on-screen display (OSD) signal, or a control signal, or the like which may be processed by the processor 130. The display 110 may be embodied as a plasma display panel (PDP), a liquid crystal display (LCD), an organic light-emitting display (OLED), a flexible display, or the like, and may also be embodied as a three-dimensional (3D) display. The display 110 may also be configured as a touch screen to be used as both an output device and an input device.

According to an embodiment of the disclosure, the display 110 of the image display device 100 may be implemented as a plasma display panel (PDP), a liquid crystal display (LCD), an organic light emitting diode (OLED), or a cathode ray tube (CRT) or the like.

According to an embodiment of the disclosure, the display 110 may display the broadcast program information under the control of the processor 130.

The tuner 140 may tune and select a frequency of a channel that a user wants to obtain via the image display device 100. The frequency may be obtained by tuning, via one or more of: amplification, mixing, and resonance, of frequency components of a broadcasting signal that may be obtained in a wired or wireless manner. The broadcasting signal may include one or more of: an audio signal, a video signal, or additional information (e.g., an EPG).

The tuner 140 may obtain a broadcast signal in a frequency domain corresponding to a channel number according to a user input (for example, a control signal obtained from a remote control device (not shown), e.g., a channel number input, a channel up-down input, and/or a channel input in an EPG screen).

The tuner 140 may obtain broadcast signals from various sources such as a terrestrial broadcast, a cable broadcast, a satellite broadcast, and/or an Internet broadcast, and the like. The tuner 140 may obtain a broadcast signal from a source such as an analog broadcast or a digital broadcast. The broadcast signal obtained through the tuner 140 may be decoded (for example, audio decoding, video decoding, or additional information decoding) and separated into audio, video and/or additional information. The separated audio, video and/or additional information may be stored in the memory 120 under the control of the processor 130.

The tuner 140 of the image display device 100 may be one or plural. The tuner 140 may be implemented as an all-in-one with the image display device 100 or may be a separate device (e.g., a set-top box) having a tuner that is electrically connected to the image display device 100, and a tuner (not shown) connected to the input/output interface 170.

The communication interface 150 may connect the image display device 100 to an external device (e.g., an audio device, etc.) (not shown) under the control of the processor 130. The processor 130 may transmit/obtain content to/from the external device (not shown) connected through the communication interface 150, download an application from the external device (not shown), or perform web browsing. The communication interface 150 may include one or more of a wireless local area network (LAN) 151, a Bluetooth 152, or a wired Ethernet 153 according to a performance and a structure of the image display device 100. The communication interface 150 may include a combination of the wireless local access network (LAN) 151, the Bluetooth 152, and the wired Ethernet 153.

Further, the communication interface 150 may obtain the control signal of the remote control device (not shown) under the control of the processor 130. The control signal may be implemented as at least one of: a Bluetooth type, an RF signal type, or a WiFi type.

The communication interface 150 may further include, for example, at least one of or both of: a near field communication (NFC) interface, or a Bluetooth low energy interface (not shown) other than Bluetooth.

The detector 160 may detect at least one of: a speech of the user, an image of the user, or an interaction of the user. The detector may correspond to or include at least one of: a microphone 161, a camera 162, or a light receiver or sensor 163.

The microphone 161 may obtain an utterance of speech by the user. The microphone 161 may convert the obtained speech into an electric signal and output the electric signal to the processor 130. The speech of the user may include, for example, a speech corresponding to a menu or a function of the image display device 100.

The camera 162 may capture (obtain) an image frame such as a still image or a moving image. An image captured through an image sensor may be processed through the processor 130 or a separate image processor (not shown).

The image frame processed by the camera 162 may be stored in the memory 120 and/or may be transmitted to the outside through the communication interface 150. The camera 162 may include one or two or more cameras according to a structure of the image display device 100.

The light receiver 163 may obtain an optical signal (including a control signal) obtained from an external remote control device (not shown). The light receiver 163 may include a light sensor. The light receiver 163 may obtain the optical signal corresponding to a user input (e.g., touch, press, touch gesture, speech, or motion) from the remote control device (not shown). The control signal may be extracted from the obtained optical signal under the control of the processor 130. For example, the light receiver 163 may obtain a control signal corresponding to a channel up/down button for channel switching from the remote controller (not shown).

The input/output interface 170 may obtain video (e.g., a moving image and the like), audio (e.g., speech, music and the like) and additional information (e.g., EPG, etc.) from outside the image display device 100 under the control of the processor 130. The input/output interface 170 may include at least one of a high-definition multimedia interface (HDMI) port 171, a component jack 172, a personal computer (PC) port 173, or a universal serial bus (USB) port 174. The input/output interface 170 may include at least one combination of the HDMI port 171, the component jack 172, the PC port 173, or the USB port 174. An external image providing device (not shown) may be connected through the HDMI port 171.

The video processor 180 may perform processing on video data obtained by the image display device 1100. The video processor 180 may perform various kinds of image processing such as one or more of: decoding, scaling, noise filtering, frame rate conversion, or resolution conversion, or the like on the video data.

The graphic processor 181 may generate a screen including various objects such as one or more of: an icon, an image, or a text, etc. using one or more of: an operator (not shown) or a renderer (not shown). The operator (not shown) may calculate attribute values such as one or more of: a coordinate value, a shape, a size, or a color to be displayed by each of the objects according to a layout of the screen using the user input detected through the detector 160. The renderer (not shown) may generate screens of various layouts including the objects based on the attribute values calculated by the operator (not shown). The screens generated by the renderer (not shown) may be displayed within a display region of the display 110.

The audio processor 115 may perform processing on audio data. The audio processor 115 may perform various kinds of processing such as one or more of: decoding, amplification, or noise filtering, or the like on the audio data. Meanwhile, the audio processor 115 may include a plurality of audio processing modules for processing audio corresponding to a plurality of contents.

The audio output interface 126 may output audio included in the broadcast signal obtained through the tuner 140 under the control of the processor 130. The audio output interface 126 may output audio (e.g., speech or sound) input through the communication interface 150 or the input/output interface 170. The audio output interface 126 may also output audio stored in the memory 120 under the control of the processor 130. The audio output interface 126 may include at least one of a speaker 127, a headphone output terminal 128, or a Sony/Philips Digital Interface (S/PDIF) output terminal 129. The audio output interface 126 may include at least one combination of the speaker 127, the headphone output terminal 128, or the S/PDIF output terminal 129.

The power supply 190 may supply power to the internal components of the image display device 100 from an external power source under the control of the processor 130. Also, the power supply 190 may supply power output from one or more batteries (not shown) located inside the image display device 100 to the internal components under the control of the processor 130.

The sensing unit 191 may sense a state of the image display device 100 or a state around the image display device 100 and may transmit sensed information to the processor 130. The sensing unit 191 may include and/or correspond to a sensor that senses a state of the image display device 100 or a state around the image display device 100.

The sensing unit 191 may include or correspond to one or more of: a magnetic sensor 192, an acceleration sensor 193, a temperature humidity sensor 194, an infrared sensor 195, a gyroscope sensor 196, a location sensor (e.g. a global positioning system (GPS)) 197, an air pressure sensor 198, a proximity sensor 199, or a red-green-blue (RGB) sensor (illuminance sensor) 201 but is not limited thereto. Functions of respective sensors may be intuitively inferred and thus, detailed descriptions thereof will be omitted.

Further, the image display device 100 including the display 110 may be electrically connected to a separate external device (e.g., a set-top box, not shown), which may include the tuner 140.

Also, the image display device 100 may be implemented as one or more of: an analog TV, a digital TV, a three-dimensional (3D)-TV, a smart TV, a light emitting diode (LED) TV, an organic LED (OLED) TV, a plasma TV, or a monitor, etc. but is not limited thereto. It will be easily understood by one of ordinary skill in the art.

Meanwhile, the block diagrams of the illustrated image display devices 100 and 100a are block diagrams for an embodiment of the disclosure. Each component of the block diagrams may be integrated, added, or omitted, according to the specifications of the actual implementation of the image display device 100. That is, two or more components may be combined into one component, or one component may be subdivided into two or more components when necessary. Furthermore, a function performed in each block is for the purpose of explaining the embodiment of the disclosure, and a specific operation or device thereof does not limit the scope of the disclosure.

On the other hand, above-described embodiment of the disclosure may be implemented in a general purpose digital computer to be written as a program that can be executed on a computer, and operate the programs using a non-transitory computer readable recording medium. In addition, the structure of the data used in the above-described embodiment of the disclosure may be recorded on a non-transitory computer readable medium through various means. Furthermore, the above-described embodiment of the disclosure may be embodied in the form of a recording medium including instructions executable by a computer, such as a program module, being executed by a computer. For example, methods implemented with software modules or algorithms may be stored in a non-transitory computer readable recording medium as codes or program commands which the computer can read and execute.

The non-transitory computer readable medium may be any recording medium that can be accessed by a computer, and may include volatile and nonvolatile media, removable and non-removable media. The non-transitory computer readable medium may include magnetic storage media, such as ROM, floppy disks, hard disks, and the like), optical storage media such as compact disc (CD) ROMs, digital video discs (DVDs), etc. The non-transitory computer readable medium may also include computer storage media and communication media.

In addition, a plurality of computer readable recording media may be distributed over computer systems connected over a network, and data stored in distributed recording media, such as program instructions and codes, may be executed by at least one computer.

The particular implementations shown and described in the disclosure are illustrative examples of the disclosure and are not intended to otherwise limit the scope of the disclosure in any way. For the sake of brevity, conventional electronics, control systems, software development and other functional aspects of the systems may not be described in detail.

Descriptions of an embodiment of the disclosure are examples, and it may be understood by one of ordinary skill in the art that various changes in form and details may be made therein without departing from the spirit and scope of the disclosure as defined by the appended claims. Thus, an embodiment of the disclosure is merely examples in every aspect and should not be construed as being limited to the embodiment set forth herein. For example, components that are described as a single piece may be separated, and components that are described as being separated may be integrated.

The use of any and all examples and exemplary language provided herein is intended merely to better illuminate the disclosure and does not pose a limitation on the scope of the disclosure unless otherwise claimed.

Moreover, no item or component is essential to the practice of the disclosure unless the element is specifically described as "essential" or "critical".

It will be understood by one of ordinary of skill in the art that various changes in form and details may be made therein without departing from the spirit and scope of the disclosure as defined by the appended claims.

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure. The embodiments of the disclosure should be considered in descriptive sense only and not for purposes of limitation.

While the disclosure has been particularly shown and described with reference to embodiments thereof, it will be understood by those of ordinary skill in the art that various changes in form and details may be made therein without departing from the spirit and scope of the disclosure as defined by the following claims.

The terms, such as "unit" or "module", etc., described herein should be understood as a unit that processes at least one function or operation and that may be embodied in a hardware manner, a software manner, or a combination of the hardware manner and the software manner.

The "unit" or the "module" may be stored in an addressable storage medium, or may be implemented by a program that may be executed by a processor.

For example, the "unit" or the "module" may be implemented by components such as software components, object-oriented software components, class components, and task components, processes, functions, properties, procedures, sub-routines, segments of program codes, drivers, firmware, micro codes, circuits, data, data base, data structures, tables, arrays, and parameters.

Throughout the specification, the description "A may include one of a1, a2 or a3" may mean, in a broad sense, that example elements that may be included in the element A are a1, a2, or a3.

Due to the above described description, the elements forming the element A are not limited to a1, a2, or a3. Therefore, the element that may be included in the A element should not be exclusively construed as being limited to a1, a2, and a3 excluding other elements that are not specified herein.

The description also means that the element A may include a1, may include a2, or may include a3. The description does not mean that elements included in the element A should be selectively determined from a preset group. For example, the description should not be construed as being limited to that a1, a2, or a3 selected from a group necessarily including a1, a2, and a3 configures a component A.

In addition, throughout the disclosure, the expression "at least one of a1, a2, and a3" indicates only a1, only a2, only a3, both a1 and a2, both a1 and a3, both a2 and a3, all of a1, a2, and a3, or variations thereof. Therefore, unless otherwise clearly stated as "at least one of a1, at least one of a2, and at least one of a3", the expression "at least one of a1, a2, and a3" should not be construed as "at least one of a1", "at least one of a2", and "at least one of a3".

What is claimed is:

1. An image display device for providing broadcast program information, the image display device comprising:
    a communication interface;
    a memory that stores one or more instructions; and
    a processor configured to execute the one or more instructions stored in the memory, the one or more instructions causing the processor to:
        automatically recognize a broadcast program that a display is currently displaying by performing image recognition;
        compare the broadcast program that the display is currently displaying with a currently scheduled broadcast program, which is identified based on metadata obtained from a metadata server via the communication interface; and
        based on identifying that the recognized broadcast program and the currently scheduled broadcast program are inconsistent, regenerate broadcast program information according to information of the broadcast program that the display is currently displaying, display the regenerated broadcast program information and transmit error data regarding the inconsistency between the currently scheduled broadcast program and the recognized broadcast program to the metadata server,
    wherein the transmitted error data includes information about a broadcast server providing the broadcast program that the display is currently displaying.

2. The image display device of claim 1, wherein the information about the broadcast server comprises identification information about the broadcast server.

3. The image display device of claim 1, wherein the processor is further configured to execute the one or more instructions to: transmit the error data to the metadata server during a predetermined period.

4. The image display device of claim 1, wherein the processor is further configured to execute the one or more instructions to: obtain updated metadata from the metadata server.

5. The image display device of claim 1, further comprising the display.

6. A method of providing program information, the method being performed by an image display device, the method comprising:
    automatically recognizing a broadcast program that a display is currently displaying by performing image recognition;
    comparing the broadcast program that the display is currently displaying with a currently scheduled broadcast program, which is identified based on metadata obtained from a metadata server via a communication interface; and
    based on identifying that the recognized broadcast program and the currently scheduled broadcast program are inconsistent, regenerating broadcast program information according to information of the broadcast program that the display is currently displaying, displaying the regenerated broadcast program information and transmitting error data regarding the inconsistency between the currently scheduled broadcast program and the recognized broadcast program to the metadata server,
    wherein the transmitted error data includes information about a broadcast server providing the broadcast program that the display is currently displaying.

7. The method of claim 6, wherein the information about the broadcast server comprises identification information about the broadcast server.

8. The method of claim 6, wherein the transmitting of the error data comprises: transmitting the error data to the metadata server during a predetermined period.

9. The method of claim 6, wherein
    analyzing the error data by a feedback server and providing, by the feedback server, the error data to a metadata provider that generated the metadata;
    updating, by the metadata provider, the metadata based on the error data; and
    transmitting, by the metadata provider, the updated metadata to the metadata server.

10. The method of claim 9, further comprising: obtaining the updated metadata from the metadata server.

11. A non-transitory computer-readable recording medium having recorded thereon a program for performing the method of claim 6 on a computer.

12. A system for providing broadcast program information, the system comprising:
    a feedback server; and
    an image display device configured to:
        automatically recognize a broadcast program that a display is currently displaying by performing image recognition;
        compare the broadcast program that the display is currently displaying with a currently scheduled broadcast program, which is identified based on metadata obtained from a metadata server via a communication interface;

based on identifying that the recognized broadcast program and the currently scheduled broadcast program are inconsistent, regenerate broadcast program information according to information of the broadcast program that the display is currently displaying and display the regenerated broadcast program information; and transmit error data regarding the inconsistency between the currently scheduled broadcast program and the recognized program to the feedback server, wherein the feedback server is configured to analyze the error data and provide the error data to a metadata provider that generated the metadata, and wherein the transmitted error data includes information about a broadcast server providing the broadcast program that the display is currently displaying.

13. The system of claim 12, wherein the metadata is updated based on the error data by the metadata provider, and the updated metadata is transmitted from the metadata provider to the metadata server.

* * * * *